United States Patent [19]

Cadariu et al.

[11] 3,870,037

[45] Mar. 11, 1975

[54] APPARATUS FOR OBSERVATIONS, PHOTOGRAPHS AND INTERVENTIONS IN THE POST-RHINAL-PHARYNGEAL REGIONS

[75] Inventors: Emil E. Cadariu; Alexandru A. Macovei, both of Bucharest, Romania

[73] Assignee: Spitalul Coltea, Bucharest, Romania

[22] Filed: July 30, 1973

[21] Appl. No.: 383,494

[52] U.S. Cl. ................................. 128/10, 128/12
[51] Int. Cl. ............................................ A61b 1/24
[58] Field of Search ............... 128/10, 11, 12; 32/69

[56] References Cited
UNITED STATES PATENTS
1,388,421  8/1921  Forgrave ............................. 128/12
3,158,935  12/1964  Rosenthal ........................ 128/11 X FOREIGN PATENTS OR APPLICATIONS
44,016  9/1910  Austria ................................. 128/11
777,655  12/1934  France ................................. 128/10

Primary Examiner—Lucie H. Laudenslager
Attorney, Agent, or Firm—Karl F. Ross; Herbert Dubno

[57] ABSTRACT

The invention relates to an apparatus for use in examinations as operations in regions of the postrhinopharyngeal cavity. The apparatus consists of a mirror insertable into the cavity and having a frame and pivots rotatable in bearings of a supporting device ended by a ring. A device with an adjustment knob is connected by a crank to the mirror. A tubular speculum may receive this assembly and be rotatable on a fixed support at an end with a ring having a rotating joint and means for displacing a composite lens or operational microscope on the support relative to the mirror. The apparatus is equipped for blowing warm air on the mirror to prevent it from misting. A device usable with this instrument has a curved and cutout plate which covers from behind and holds back the uvula and the soft palate. This device has a variable length and carries via a hinge another curved plate with a cutout which bears on the nasal fossae, clinging to the patient's face.

6 Claims, 5 Drawing Figures

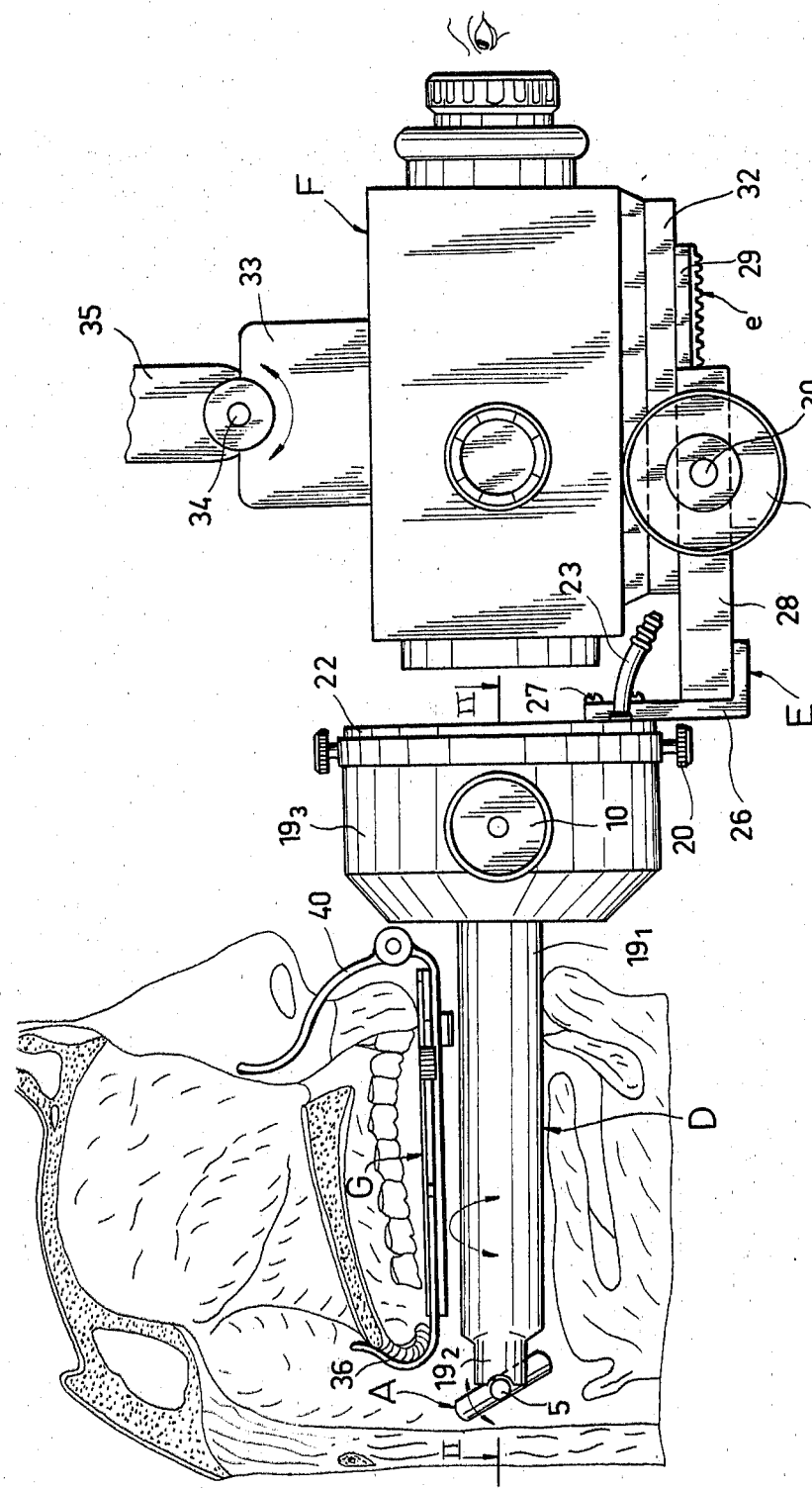

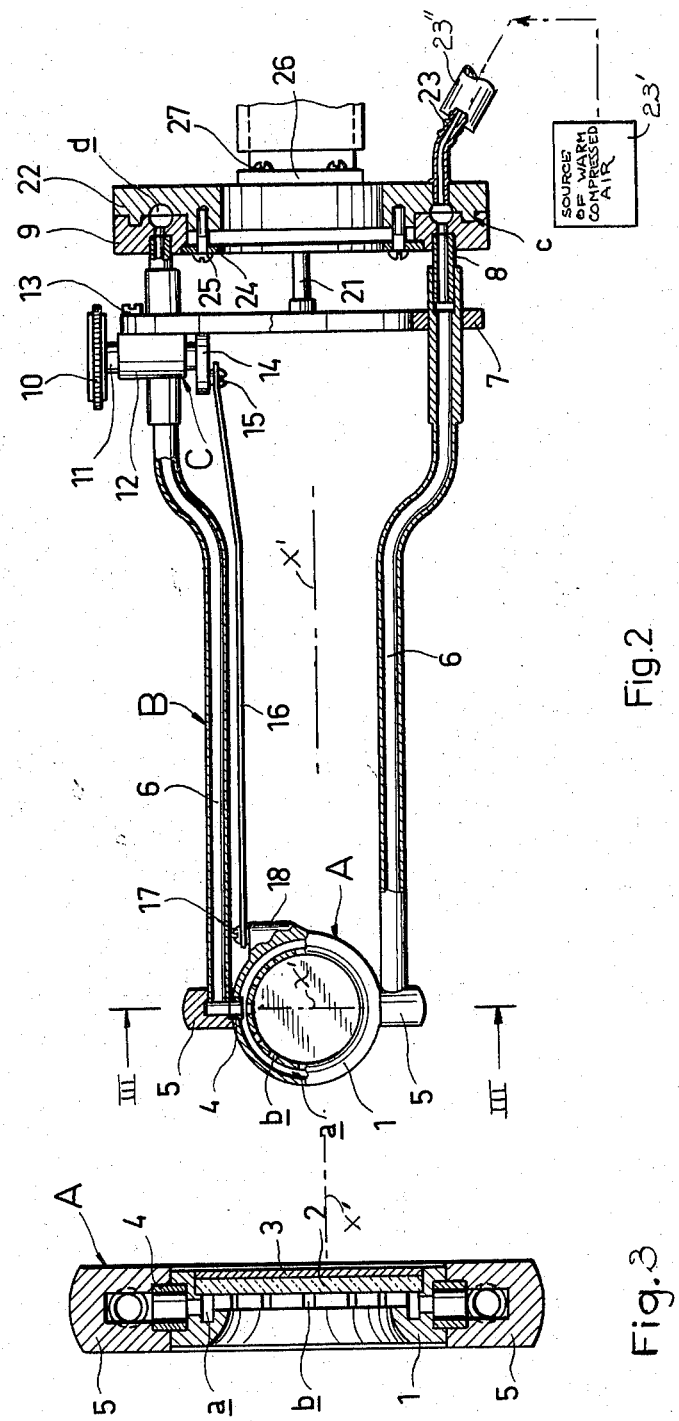

APPARATUS FOR OBSERVATIONS, PHOTOGRAPHS AND INTERVENTIONS IN THE POST-RHINAL-PHARYNGEAL REGIONS

FIELD OF THE INVENTION

The invention relates to an apparatus for examining photographing and operating in the postrhinopharyngeal regions, more particularly for examinations either direct or with an operational microscope for purposes of diagnosis, or for operating, or for detecting and extracting foreign bodies.

BACKGROUND OF THE INVENTION

Endoscopes are known which are intended for examining the postrhinopharyngeal cavity and which present the drawback that the images obtained are monocular with a two-power magnification at most.

There are also known stereomicroscopes that offer the possibility of observation and photography by using small mirrors carried on rods in front of the objective, as, for instance, in an operational microscope in which the images have relatively high magnifications. This type of microscope only allows changes of direction, always focusing the image for observation at a fixed distance which is determined by the selected lens and by the displacement of the entire support and/or of the body of the microscope. In addition such microscopes are provided with a light source whose beam is directed along the optic axis and reflected back into the view field for observations, surgery, photography or filming. The known microscopes have the drawback that they cannot be used comfortably, especially in the precise examination of the postrhinopharyngeal regions; neither do they allow biopsies or limited operations, nor extractions of foreign bodies under the contron of the stereoendoscopic sight.

OBJECTS OF THE INVENTION

It is therefore an object of the present invention to provide an improved endoscope particularly useful in examining and working in the back of the mouth.

Another object is the provision of such an apparatus which is simple to use, and which can be employed along with a stereo microscope, or a camera, or which can be employed during a surgical operation in the postrhinopharyngeal region.

SUMMARY OF THE INVENTION

These objects are attained according to the present invention wherein an apparatus for examining, photographing, and surgically operating in the postrhinopharyngeal region, that is for precise direct examinations or by means of an operational microscope so as to eliminate the drawbacks of the known equipments, comprises the following:

a mirror located in the postrhinopharyngeal cavity and having a circular or oval frame and two tubular pivot gudgeons rotatable in bearings of a supporting device and also is rotatable;

a fixed support outside the mouth of the patient, which supports on one side the outer end of the preceding device for supporting the frame of the mirror, and on the other side which carries a composite or lena for direct visual examinations or which is fastened to theoperational microscope, relative to which it is displaceable for focusing the image, the supporting device maintaining the mirror at the center on the optic axis of the ocular or of the objective of the microscope even during rotation of the supporting device of the mirror frame;

a device forlimited manual rotation, from outside, of the mirror frame on its gudgeons which define a mirror axis transverse to the optic axis;

a speculum, formed substantially as a body of revolution around the optic axis, that covers and receives the supporting device of the mirror and is at its inner end, oval and formed with two prolongations which hold the bearings for the rotation of the mirror frame, while its outer end is fastened to the fixed support by means of an enlarged terminal box;

means for blowing warm air over the mirror through flexible or rigid supply conduit that communicates with the hollow interior of at least one of the tubular pivot gudgeons of the mirror frame and, further on, with a channel formed in the frame from which radial passages extend for conducting the air toward the face of the mirror;

a device for holding the uvula and soft palate out of the way by means of a curved plate with a terminal cutout for engagement over the extremity of the bony palate, a plate formed with a slide bar displaceable in a linear sliding guide and lockable at a plurality of positions, and whose body carries at its outer end at a blockable hinge another curved plate, also ending in a cutout, that bears against the basis of the nasal fossae, clinging to the face of the patient.

DESCRIPTION OF THE DRAWING

The above and other objects, features, and advantages will become more readily apparent from the following with reference to the accompanying drawing in which:

FIG. 1 is a side sectional view of the apparatus according to this invention;

FIG. 2 is a longitudinal partial section of the apparatus taken along line II — II of FIG. 1;

FIG. 3 is a cross section taken along line III — III of FIG. 2, in enlarged scale;

SPECIFIC DESCRIPTION

Figure 4:
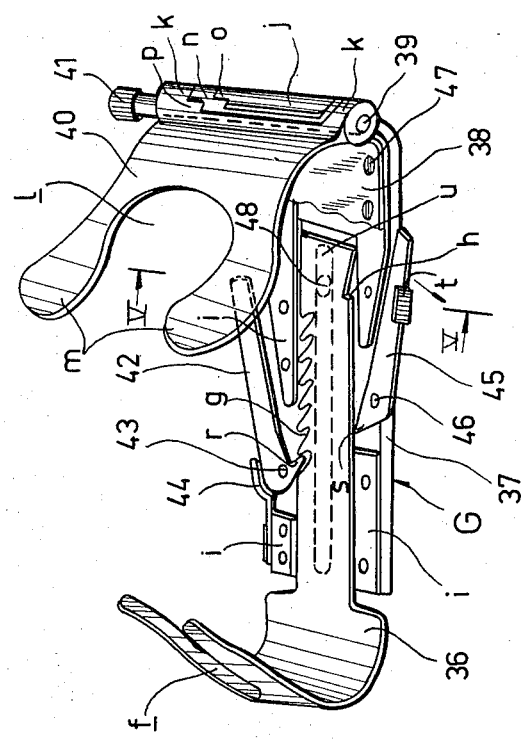
FIG. 4 is a perspective view, partially broken away of the supporting device for the uvula and soft palate.

The apparatus according to the invention comprises as shown in FIG. 3, a mirror assembly A having an annular frame 1 that supports a planar mirror 2 fitted into a circular cavity of frame 1 and covered at its back by a disk 3. A circularly annular chamber $a$ is formed in the frame 1 with radially opening orifices $b$ that are also cut into the frame 1 and open toward the interior at the level of the mirror face. Two tubular and diametrically coaxial gudgeons 4 are fastened to the frame and communicate through their hollow interiors with the circular chamber or manifold $a$. The gudgeons 4 are rotatably mounted in bearings 5 of a supporting device B of mirror A as shown in FIGS. 1 and 2. This device B consists of two tubular arms 6 that traverse from the same side the walls of the hollow bearings 5. These arms are curved outwardly and are otherwise parallel and coplanar. They have thickened ends which pass through a disk 7 to which they are fastened, then the ends are received in two tubes 8 which are joined to O-ring 9 terminaging the device B.

The mirror A can oscillate limitedly on its hollow support gudgeons 4 in bearings 5 on actuation of the frame 1 by a rotating device C best seen in FIG. 2. This has an outer actuating knurled knob 10 at the end of an axle pin 11 rotatable in a bearing 12 secured by screws 13 to the disk 7 next to one of the arms 6. The axle 11 carries at its other end a disk 14 with an eccentric bolt 15 serving as pivot for one end of a connecting rod 16. The other end of the connecting rod 16 is pivoted on an axle 17 which is threaded into an arm 18 formed on the frame 1 of mirror A. The distance from the axle 17 to the gudgeons 4 constitutes the oscillating rotating arm of mirror A determined by the connecting rod 16 in relation to the disk 14 and to the distance from the axis 15 to the center of disk 14. The device C is made in such a way that the total amplitude of the oscillation of mirror A around its axis X is about 90°.

The supporting device B is received in a speculum D formed as a tubular body of revolution. The end $19_2$ of its central tube $19_1$ is oval in section and has two diametrically opposite prolongations provided with hollows that hold the bearings 5 in which the mirror A is rotatable. The end $19_3$ towards the exterior of the speculum D is an enlarged terminal box that receives the ring 9 that terminates the supporting device B and to which it is fastened by means of two diametrically opposite screws with knurled head 20. The disk 7 carries towards the ring 9 two spacer bolts 21.

In the illustrated example, the rotating device C of the mirror is mounted inside the speculum, so that only the knurled knob 10 projects to the outside in order to allow manual adjustment of the angular position of the mirror 2. The device C can however be mounted on the outside of the speculum. In either case it is painted dull black inside as is the frame and backside of the mirror, in order to absorb light leaking into it.

The outer fixed support E has at its end towards device B a ring 22 having the same diameter as the ring 9. The rings 9 and 22 are joined by a mating shoulder and circular channel c to maintain between them an intermediary circularly annular channel d that communicates with the tubular arms 6. The ring 22 is connected on the outside to a nipple 23 connected to a source 23' of warm compressed air. The two rings are held together by a disk 24 and screws 25 leaving the rings relatively rotatable.

The fixed ring 22 is fastened by an L-bracket 26 secured by screws 27 to a sliding guide 28 of a slide bar 29 formed as a rack e, whose pinion is mounted on an axle 30 having lateral knurled knobs 31. Above the slide bar 29 a mounting plate 32 supports a composite observation lens (not shown) or an operational microscope F. A connecting fork 33 pivoted on a screw 34 fastened in a fixed ear 35 pivotally suspends the operational microscope F.

The rings 9 and 22 allow the rotation of device B with speculum D by operation of the rotating device C to pivot mirror A and rotate it around the optic axis X' of the composite lens as of the operational microscope objective.

Figure 5:
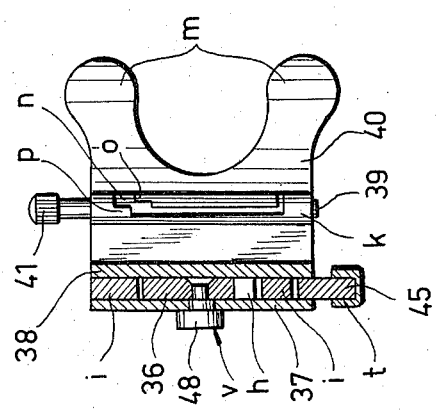
FIG. 5 is a cross section taken along line V — V of FIG. 4.

As shown in FIGS. 4 and 5, the device G for holding the uvula and the soft palate forward consists of an inner curved L-shaped plate 36 provided at its end with a cutout. The plate 36 at its other end is formed as a slide-bar provided on one of its longitudinal edges with a row of inclined teeth g and on its other edge towards its free end with a shoulder h. The slide-bar of piece 36 is slidable in a guide 37 with apertured edges i and provided with a cover-plate 38. The sliding guide 37 is formed on the outside, with a sleeve j that pivots about an axle 39. An outer curved plate 40 has sleeves k receiving axle 39. The axle 39 is fastened to the sleeve j and projects on one side where it is threaded. A knurled nut 41 screwed on this end allows one to block in a certain position the outer curved plate 40. The curved plate 40 is provided with a terminal cutting-out l, that has two arms m. Between the inner sleeve j and the complementary outer sleeve k of the articulation with axle 39 is an empty space n. The sleeve j and one of the adjacent sleeves k are cut out to have matching stepped formations o and p, respectively, that may be coupled together by relative axial displacement of the plate 38 of the slide guide and of the curved plate 40 to rotationally lock together the sleeves j and k which is effected by screwing down the nut 41. Unscrewing the nut 41 disengages the formations o and p so that the curved plate 40 may be swung outwardly through about 90° from its blocked position.

The sliding guide 37 with its cover-plate 38 carries between them at an edge i a ratchet or catch with a projecting rod 42 that is rotatable around a bolt 43 and has a tooth r which can mesh with the inclined teeth g of the glide-bar of piece 36. To position the glide-bar the tooth r blocks the glide-bar and is blocked, in turn, by the leaf spring 44. The sliding guide 37 with its cover-plate 38 further carries at its other edge another catch with a projecting bar 45 that is rotatable around a bolt 46. This catch allows the manual blocking and unblocking of the slide-bar of piece 36 at its shoulder h by means of a tooth s of the catch 45. This catch has a spur t which, when pulled outwardly together with the bar blocks and when pushed inwardly performs the unblocking. Finally, the cover-plate 38 is fastened to the sliding guide 37 by means of screws 47. The sliding guide 37 has an axially elongated cut out u through which a calibrated screw 48 passes having an outside prominent head v screwed into the slide-bar of the curved piece 36 for the precise guiding of the sliding guide 37 while serving as a finger guide on insertion of the device into the buccal cavity as shown in FIG. 1.

When utilizing the described apparatus the first step is the application of the device G for holding back the uvula and the soft palate. To this end the device G is brought to the maximal length by depression of the lever of the catch 42 and with the catch 45 in the blocking position of the slide-bar of plate 36, that is resting on its shoulder h. At the same time the curved plate 40 is swung out on the outside, after unblocking the paws o and p. After catching from behind the uvula and the soft palate on the curved plate 36, this is raised upward to hold it over the extremity of the bony palate. The outer curved plate is then brought back into blocking position and it is blocked by screwing the nut 41 down. The length of the device G is then adjusted according to the patient by unblocking the catcher 45 and pulling the head v of the screw-axle 48 while raising the outer curved plate 40, and applying it onto the patients face and next to his nasal fossae.

The parts A, B, C, D are then assembled and inserted into the buccal cavity of the patient until the mirror A touches the back wall of the rhinopharynx which has been anaesthetized in advance. The images transmitted by the mirror are observed in the microscope F.

The segmentary examination of each region from the rhinopharynx is performed by successively directing the mirror A towards them by rotating it around the gudgeons 4 on its axis X with device C and also by rotating the entire device B together with the mirror device C and speculum around the optic axis X' of the unit while adjusting the position of the center of mirror A in the rhinopharynx. For each segmentary examination the received image is focused by adjusting the knobs 31 that perform the gliding of the guide 28 on slide-bar 29 thereby modifying the optical path between the investigated zone and the microscope objective. The focused images may be photographed or filmed by the corresponding apparatus applied to the microscope.

In cases of surginal operations the apparatus may be used without the speculum which creates an increased space that allows the introduction into the rhinopharynx of the instruments needed for the surgery.

The warming up of mirror 2 to prevent its fogging and its cleaning, during operation, is carried out by continuously introducing warm air from source 23' through a flexible tube 23'' fitted over connection 23 so that this air passes through the arm of tube 6, gudgeon 4, circular channel a and the radial channels b.

By using the apparatus according to the invention, the following advantages are obtained:

the different regions of the rhinopharynx can be examined segmentarily and endoscopically with a composite lens at medium magnification;

the postrhinopharyngeal regions can be examined segmentarily and stereoscopically at a superior magnification to allow observation of incipient neoplasic lesions and other minimal lesions of the rhinopharyns; very small foreign bodies hidden in the anfractuosities of the mucous membrane may also be seen as well as their location;

stereoscopic photographs of all portions of the examined regions and of the minimal lesions can be obtained.

We claim:

1. An endoscope system comprising:
a stationary support;
a tubular housing defining an optic axis and having a narrow end distal from said support and a broad end adjacent said support;
a mirror assembly pivotal about a mirror axis transverse to said optic axis and including a planar mirror having a reflective face, a frame surrounding said mirror and formed with an annular chamber and a plurality of orifices extending from said chamber and opening toward said face of said mirror, and at least one hollow pivot gudgeon journaled in said narrow end of said housing on said mirror axis and having a hollow interior communicating with said chamber, said housing including a pair of hollow arms each having one end carrying a respective gudgeon, and each having another end attached to said means for rotation of said housing and said assembly about said optic axis, said means for feeding air being connected to said other ends of said arms;
means for feeding air through said gudgeon into said chamber and thence through said orifices over said face of said mirror for demisting same;
means on said support for rotation of said housing and said mirror assembly about said optic axis;
means on said broad end of said housing including a link extending to said mirror assembly for pivoting said assembly about said mirror axis; and
means on said support including a mounting plate adapted to carry an observation apparatus for displacing said plate along said optic axis.

2. The endoscope system defined in claim 1 wherein said means for rotation of said housing and said assembly includes a first ring secured to said support, a second ring secured to said other ends of said arms and rotatable relative to said first ring, said rings being formed at their interface with an annular chamber opening in said second ring into said other ends of said arms, said means for demisting including a connection through said first ring with said chamber at said interface for feeding air thereto.

3. The endoscope system defined in claim 1 wherein said means for rotating said mirror assembly about said mirror axis includes a pivot on said housing, a knob carried on said pivot outside said housing, an eccentric crank carried on said pivot inside said housing, and a pivot pin on said frame offset from said mirror axis, said link having one end connected to said crank and another end connected to said pivot pin.

4. The endoscope system defined in claim 1 wherein said housing includes a tube formed as a body of revolution centered on said optic axis, said mirror axis intersecting said optic axis.

5. The endoscope system defined in claim 1 wherein said mounting plate and said support each have a respective neighboring portion, said means for displacing said mounting plate relative to said support including a rack formed on one of said portions and a rotatable pinion meshing with said rack and pivoted in the other of said portions.

6. The endoscope system defined in claim 5 wherein said portion with said rack is formed on said mounting plate and said portion with said pinion is on said support.

* * * * *